United States Patent
D'Amico

(10) Patent No.: US 10,413,110 B2
(45) Date of Patent: Sep. 17, 2019

(54) BREW BASKET AND BREWER USING SAME

(71) Applicant: S&D Coffee, Inc., Concord, NC (US)

(72) Inventor: Anthony T. D'Amico, Charlotte, NC (US)

(73) Assignee: S&D Coffee, Inc., Conover, NC (US)

( * ) Notice: Subject to any disclaimer, the term of this patent is extended or adjusted under 35 U.S.C. 154(b) by 270 days.

(21) Appl. No.: 15/373,589

(22) Filed: Dec. 9, 2016

(65) Prior Publication Data

US 2017/0181566 A1 Jun. 29, 2017

Related U.S. Application Data

(63) Continuation-in-part of application No. 29/549,907, filed on Dec. 29, 2015, now Pat. No. Des. 827,367, and a continuation-in-part of application No. 29/549,908, filed on Dec. 29, 2015, now Pat. No. Des. 793,157, and a continuation-in-part of application No. 29/563,057, filed on May 2, 2016, now Pat. No. Des. 793,805.

(51) Int. Cl.
*A47J 31/06* (2006.01)

(52) U.S. Cl.
CPC ........... *A47J 31/0626* (2013.01); *A47J 31/06* (2013.01)

(58) Field of Classification Search
CPC .............................. A47J 31/0626; A47J 31/06
See application file for complete search history.

(56) References Cited

U.S. PATENT DOCUMENTS

| 4,207,809 A | 6/1980 | Brill |
| 4,280,401 A | 7/1981 | Cleland |
| 4,579,048 A * | 4/1986 | Stover .................... A47J 31/002 99/280 |
| 4,802,406 A | 2/1989 | Bouldin |
| 5,231,918 A * | 8/1993 | Grzywna ............ A47J 31/0615 99/295 |
| 5,245,914 A * | 9/1993 | Vitous .................... A47J 31/007 99/280 |
| 5,340,597 A | 8/1994 | Gilbert |
| 5,957,035 A | 9/1999 | Richter |
| D423,284 S | 4/2000 | Fischer |
| D442,430 S | 5/2001 | Pope |

(Continued)

OTHER PUBLICATIONS

Amazon, brew basket, http://ecx.images-amazon.com/images/I/31DQ7teMgml..SY300.jpg, known at least as early as Oct. 6, 2015, last viewed Oct. 6, 2015, 1 pg.

(Continued)

*Primary Examiner* — Anthony J Weier
(74) *Attorney, Agent, or Firm* — Womble Bond Dickinson (US) LLP

(57) ABSTRACT

A brew basket is described that has a handle and a body attached to the handle. The body provides an upper chamber and a lower chamber. A top opening to the upper chamber is substantially circular with a center C. A floor of the upper chamber provides a shelf for initially supporting a beverage medium filter pack above the lower chamber. When viewed from above, the shelf is substantially rectangular. A discharge port is located at a bottom of the lower chamber and is offset from the center C when viewed from above.

19 Claims, 11 Drawing Sheets

(56) References Cited

U.S. PATENT DOCUMENTS

| | | | |
|---|---|---|---|
| 6,260,476 B1 | 7/2001 | Pope | |
| D459,152 S | 6/2002 | Fischer et al. | |
| D460,660 S | 7/2002 | Fischer et al. | |
| 6,439,105 B1 | 8/2002 | Ford | |
| D486,355 S | 2/2004 | Lyall, III | |
| 6,786,136 B2 * | 9/2004 | Cirigliano | A47J 31/0642 426/433 |
| 7,021,198 B1 | 4/2006 | Iyall | |
| D542,088 S | 5/2007 | Albrecht | |
| 8,539,876 B2 | 9/2013 | Webster et al. | |
| D772,644 S | 11/2016 | Kestenbaum | |
| 9,730,548 B1 * | 8/2017 | Sipp | A47J 31/46 |

OTHER PUBLICATIONS

Bloomfield metal brew basket, known at least as early as Feb. 28, 2000, 2 pgs.
Bunn-o-matic Corp., metal brew basket, known at least as early as Feb. 28, 2000, 2 pgs.
Bunn-o-matic Corp., plastic brew basket, known at least as early as May 19, 1999, 2 pg.
Bunn-o-matic Corp., plastic brew basket, known at least as early as May 19, 1999, 2 pgs.
Bunn-o-matic Corp., plastic tea brew basket, known at least as early as Feb. 28, 2000, 2 pgs.
CW-USA brew basket, http:/www.cw-usa.com/common/images/products/large/bunn-04274-0012-rectangular-filter, known at least as early as Oct. 6, 2015, last viewed Oct. 6, 2015, 1 pg.
Wilbur metal brew basket, known at least as early as Feb. 28, 2000, 2 pgs.

\* cited by examiner

BREW BASKET AND BREWER USING SAME

PRIORITY

The present application is a continuation-in-part of pending U.S. design application 29/549,907, filed on Dec. 29, 2015. The present application is also a continuation-in-part of pending U.S. design application 29/549,908, filed on Dec. 29, 2015. The present application is also a continuation-in-part of pending U.S. design application 29/563,057, filed on May 2, 2016. The content of each of these priority applications is incorporated herein in its entirety.

FIELD OF THE DISCLOSURE

The present disclosure relates to brew baskets intended to hold a beverage making medium using dry components such as coffee or tea, and allow water to pass through during the brewing process. More particularly, the present disclosure relates to brew baskets capable of discharging an extracted beverage in at least two locations relative to a brewer.

BACKGROUND AND SUMMARY

Restaurateurs often offer freshly brewed beverages, such as coffee or tea, to their customers or guests. To brew sufficient quantities, institutional or industrial brewers are often used in places like restaurants, hotels, and cafeterias. Industrial brewers, however, can require significant counter space in either a kitchen or self-serve location within the establishment. Therefore, operators wish to minimize the quantity of separate brewers in use. Restauranteurs, however, often wish to provide more than one variety of freshly brewed beverages, for example, coffee with and without caffeine. In other instances, to avoid a gap in availability, restauranteurs prefer to have one dispenser or brewer with the beverage available, while a second dispenser or brewer is actively brewing a subsequent batch.

To address these concerns, several brewing machines have been designed or retrofit to support dual dispensers. These are sometimes referred to as multiple dispenser brewing systems. FIG. 1 shows a brewer 10 according to one version of the prior art. The brewer 10 is an industrial brewer capable of making batches of coffee or tea in excess of two liters. The brewer 10 includes a hood 12 configured to support a brew basket (not shown). The brewer 10 can also include one or more dispensers 16 positioned generally below the hood 12. Attached to a bottom side of the hood 12 are a pair of spaced apart rails 18 that are configured to support the brew basket. A spray head 20 is supported on the hood 12 between the pair of rails 18 and is configured to dispense a solvent, such as hot water, into the brew basket. The spray head 20 can be gravity fed, or can add water to the brew basket under additional pressure. One or more stop posts 22 can extend from the bottom side of the hood 12 to position the brew basket below the spray head 20. In some cases, brewers 10 may not have such stop posts. As is known to one of ordinary skill in the art, the brewer 10 can have additional systems and subsystems to facilitate the brewing or steeping processes used to extract consumable elements from a beverage making medium, such as ground roasted coffee beans or dried tea leaves. Possible additional systems and subsystems (not shown) include control systems, heating systems, and water receiving systems as known in the art.

The present disclosure describes an improved brew basket for selectively dispensing beverage extract into the one or more dispensers 16.

In one embodiment, a brew basket is described that can have a handle and a body attached to the handle. The body can provide an upper chamber and a lower chamber. A top opening to the upper chamber can be substantially circular with a center C. A floor of the upper chamber can provide a shelf for initially supporting a beverage medium filter pack above the lower chamber. When viewed from above, the shelf can be substantially rectangular. A discharge port can be located at a bottom of the lower chamber and offset from the center C when viewed from above.

In another embodiment, a brew basket is described that can have a handle and a body attached to the handle. A top opening to the body can be substantially circular with a center C. An imaginary arrow from the center C bisecting the handle can define a handle direction. A discharge port of the body, when viewed from above, can be offset from the center C. A rim can extend from the top opening to support the brew basket between a pair of rails of a brewer. When positioned between the pair of rails, the brew basket can be rotatable between a neutral position and a dispensing position by rotation around a vertical axis passing through the center C. The handle direction is parallel with the pair of rails when the brew basket is in the neutral position, and the handle is rotated toward a respective one of the rails in the dispensing position. The rim can be configured to interact with a stop post of the brewer to translate the brew basket relative to the brewer while the handle is rotated from the neutral position to the dispensing position.

Yet other embodiments of the present disclosure include methods of funneling a solvent from a spray head to a selected one of a pair of dispensers, wherein the spray head is part of a brewer that also includes a pair of rails and a pair of stop posts. The method can comprise inserting a brew basket between the pair of rails until a rim of the brew basket abuts at least one of the pair of stop posts. The method can further comprise rotating the brew basket relative to the pair of rails while the rim remains in contact with at least one of the stop posts such that contact between the rim and the at least one stop post during rotation causes shifting of the brew basket along the pair of rails.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

FIGS. 2-6 show several views of a first embodiment of a brew basket 30 according to aspects of the present disclosure. As seen in at least FIG. 2, the brew basket 30 can include a handle 32 and a body 34. The handle 32 can be formed integrally with the body 34 as shown in the illustrated embodiment. In other embodiments, the handle 32 can be separable from the body 34 as is generally known in the art of brew baskets for institutional brewers.

Figure 1:
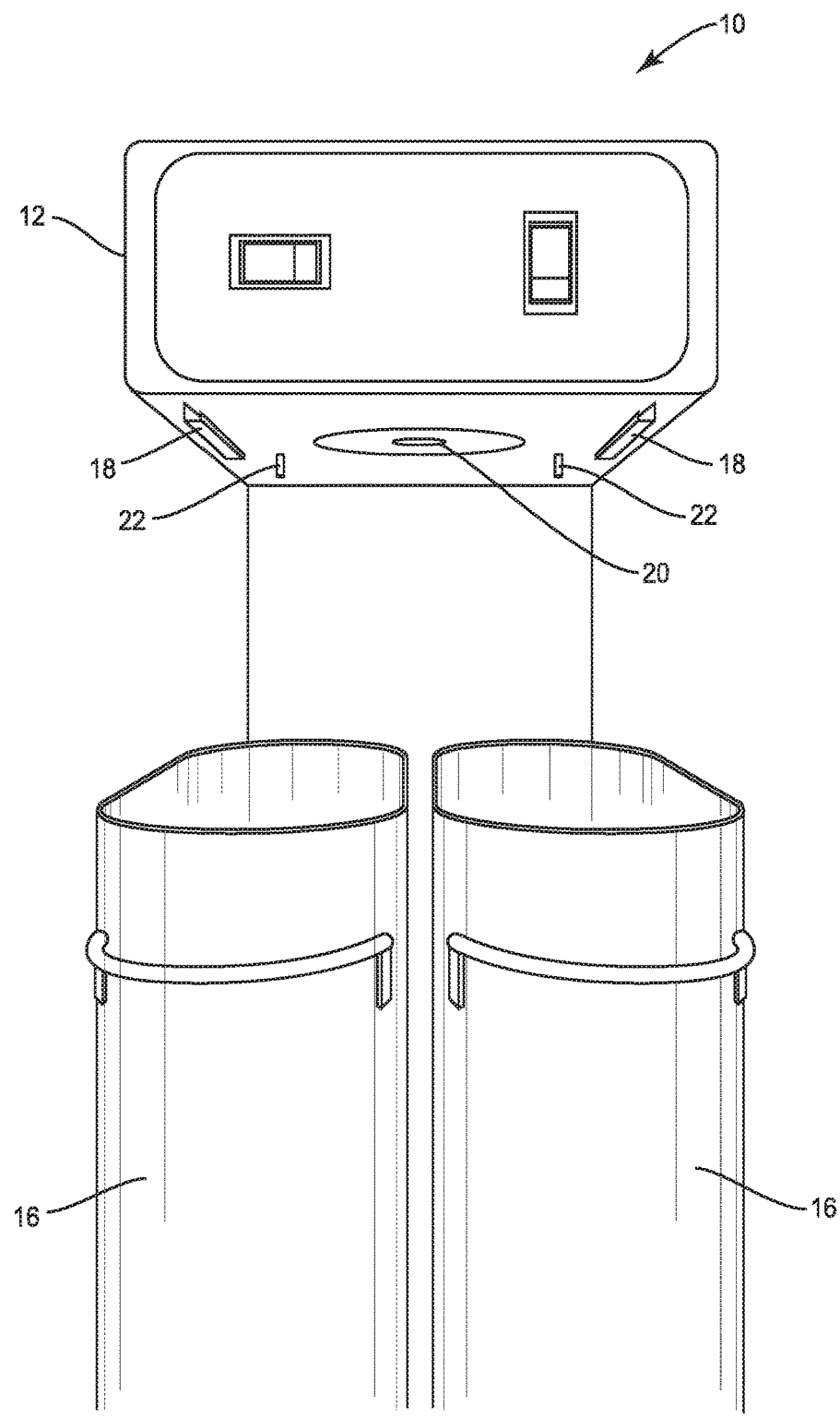
FIG. 1 shows a brewer according to the prior art suitable for use with brew baskets of the present disclosure.
Figure 2:
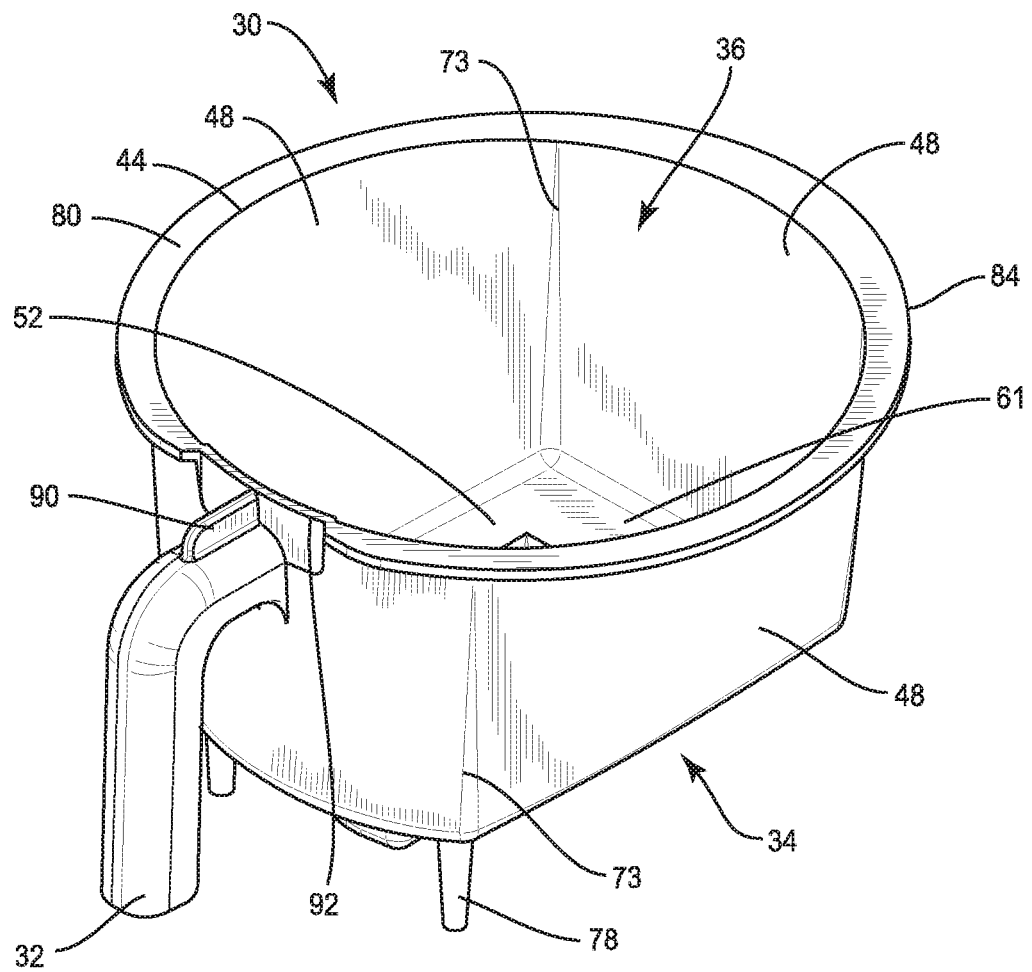
FIG. 2 is an upper perspective view of a brew basket according to an embodiment of the present disclosure.
Figure 3:
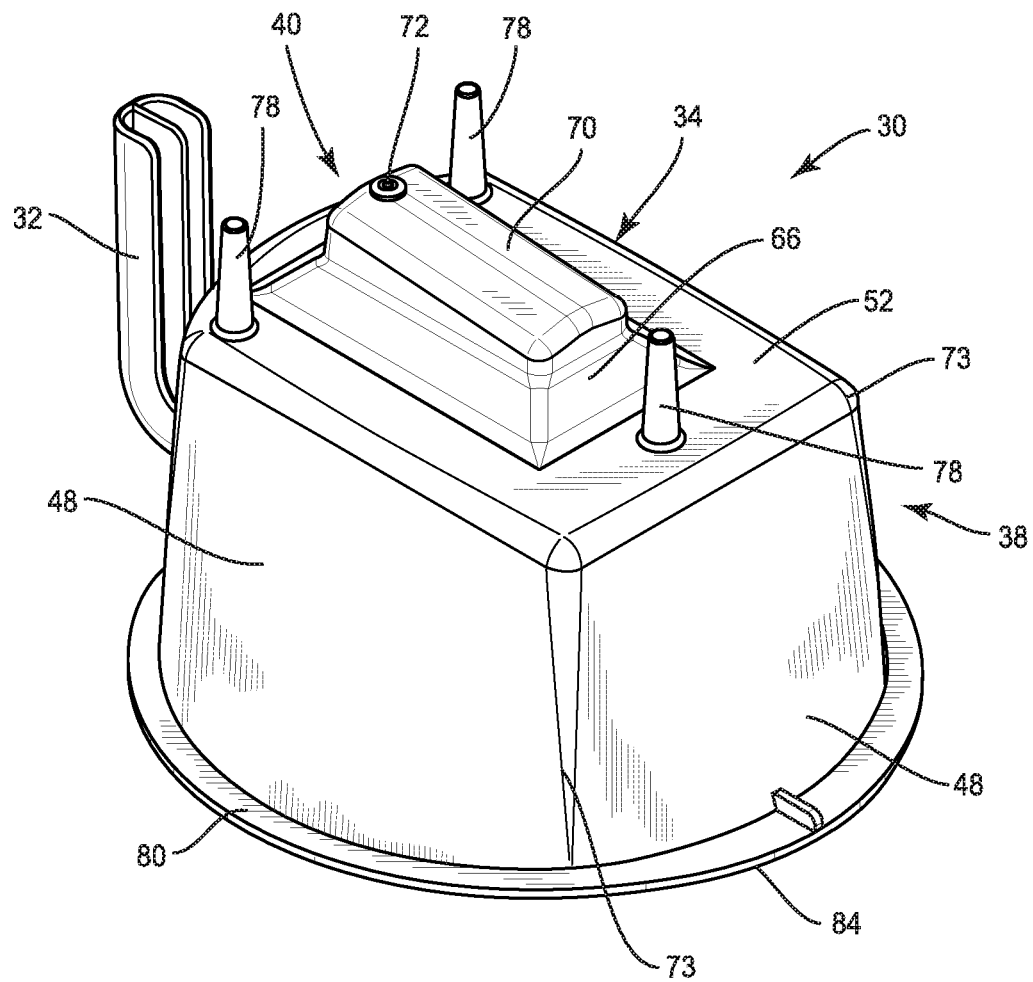
FIG. 3 is a lower perspective view of the brew basket of FIG. 2.

Staying with FIG. 2, the body 34 can provide an interior cavity 36 for containing the beverage making medium and receiving the solvent from the spray head 20 (FIG. 1) during the brewing or steeping process. Shown in FIG. 5, the interior cavity 36 can include an upper chamber 38 and a lower chamber 40. The upper chamber 38 can be bounded by a top opening 44, a peripheral wall 48 and a bottom wall 52. As seen in FIG. 6, the top opening 44 can be circular or substantially circular in shape. The bottom wall 52, when viewed from the top (as shown in FIG. 6) can be rectangular or substantially rectangular. In the illustrated embodiment, the bottom wall 52 is substantially rectangular, shown with three generally linear edges 56 with the fourth edge 58 slightly curved. The peripheral wall 48 can be at least partially tapered to transition from the top opening 44 to the substantially rectangular periphery of the bottom wall 52 of the illustrated embodiment. The bottom wall 52 of the upper chamber 38 can have an opening 60 that provides the upper bounds of the lower chamber 40.

Figure 5:
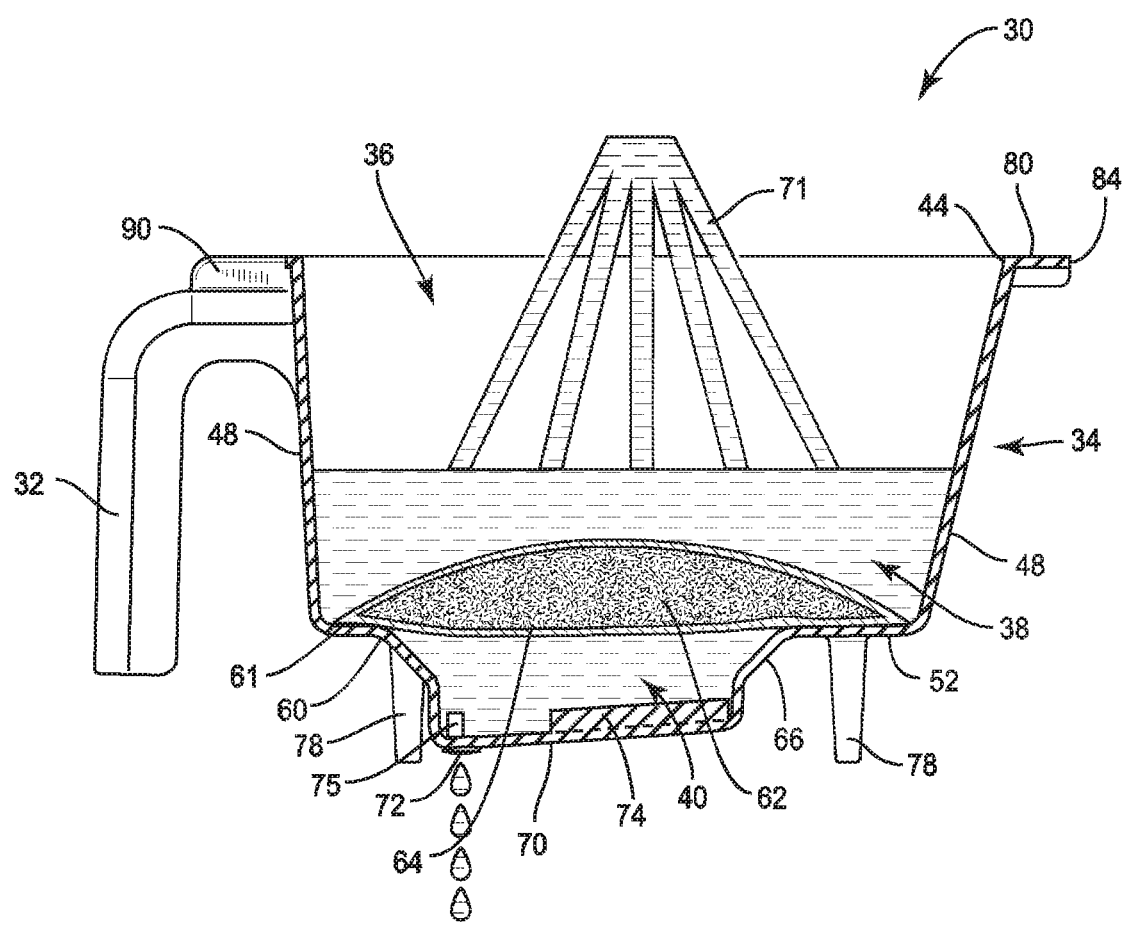
FIG. 5 is a cross-sectional view of the brew basket of FIG. 4 schematically shown in-use during a brewing process.
Figure 6:
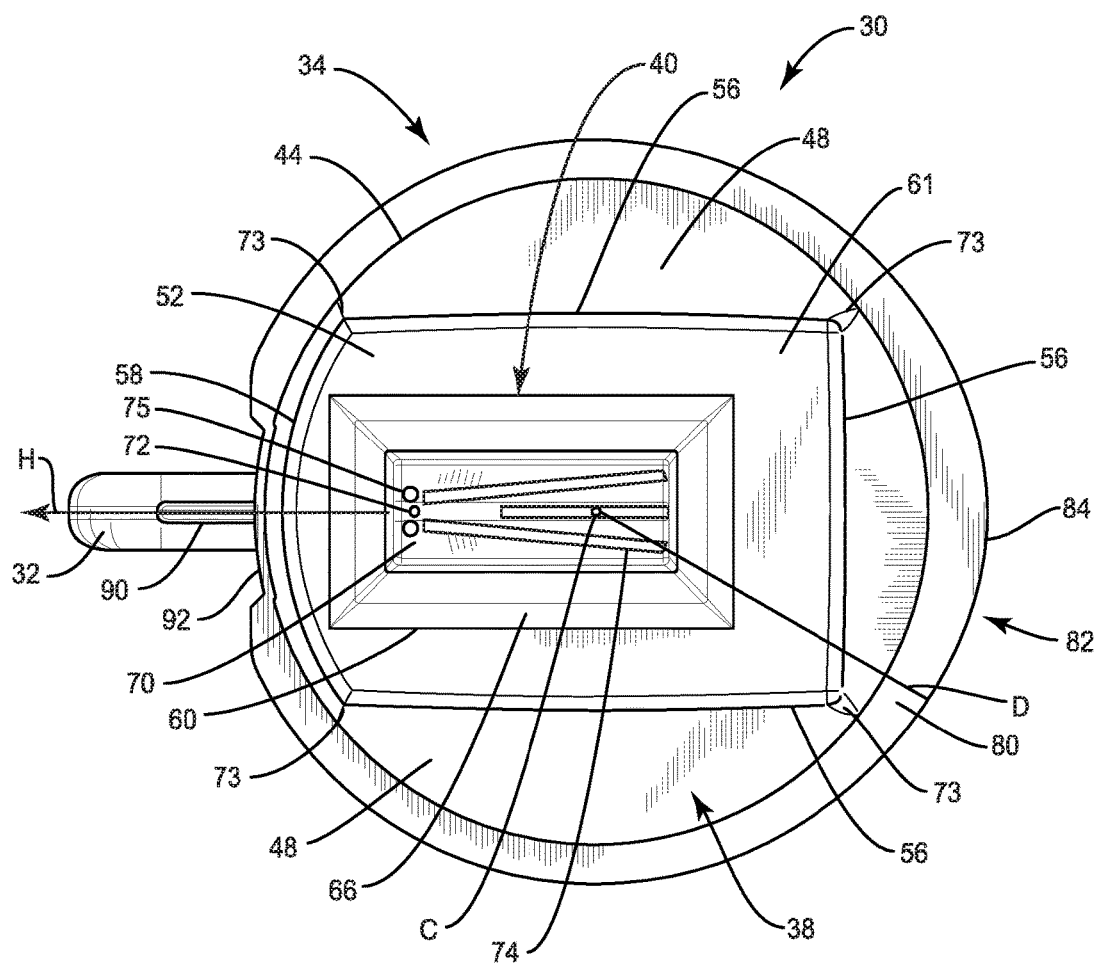
FIG. 6 is a top view of the brew basket of FIG. 2.

As seen in FIG. 5, the bottom wall 52 of the upper chamber 38 provides a floor that can act as a shelf 61 for supporting a beverage making medium 62 such as ground roasted coffee beans or dried tea leaves. In the illustrated embodiment, the beverage making medium 62 is provided in a pre-measured quantity within a filter pack 64. The brew basket 30 of the present disclosure can be particularly effective when the filter pack 64 has a substantially rectangular shape such that the shape of the filter pack 64 generally corresponds with the shape and dimensions of the bottom wall 52 upon which the filter pack 64 can be initially placed. Use of filter packs 64 whose shape does not correspond with the shape or dimension of the bottom wall 52 is also contemplated. In other embodiments, a filter material may be disposably placed along the bottom wall 52 and separately covered with the beverage making medium 62. This embodiment is generally known in the art as "open brewing."

As shown in FIG. 5, the lower chamber 40 is in fluid communication with the upper chamber 38. The lower chamber 40 can be bound by the opening 60 in the bottom wall 52 of the upper chamber 38. The opening 60 can have a substantially rectangular shape when viewed from above as seen in FIG. 6. The lower chamber 40 can also be defined by a plurality of tapered side walls 66, as seen in FIG. 5, extending upward from a floor 70. The floor 70 can be sloped to channel beverage extract toward a discharge port 72.

The brew basket 30 helps facilitate a brewing process as generally known in the art. For example, as seen in FIG. 5, a solvent, e.g. hot water 71, is directed into the brew basket 30, the hot water 71 is initially blocked by the filter pack 64 and collects within the upper chamber 38. As the filter pack 64 becomes saturated with water, the extruded beverage extract drips through the filter pack to the lower chamber 40 and through the discharge port 72.

As described above, the preferred shape of the bottom wall 52 is substantially rectangular or square when viewed from above as shown in FIG. 6. The rectangular or square shape is preferred because the bends 73 of the peripheral wall 48 create small areas or gaps where the seal between the filter pack 64 and the bottom wall 52 is not perfect. These gaps can allow for some seepage to facilitate a preferred extraction and brew cycle time.

As shown in FIG. 6, the floor 70 of the lower chamber 40 can have diagonally extending raised ribs 74 that converge toward the discharge port 72. In other embodiments, the ribs 74 may be generally parallel to one another along either the long or short side of the lower chamber 40. The raised ribs 74 preferably are raised from about 0.04 to 0.12 inches from the floor 70 and most preferably about 0.12 inches from the floor. The raised ribs 74 can help prevent total clogging of the discharge port 72, for example, if the filter pack 64 (FIG. 5) drops into the lower chamber 40 during the brewing process described above. Additionally, the illustrated embodiment includes a pair of studs 75 arranged to flank the discharge port 72. These studs 75 can further prevent total clogging of the discharge port 72. The studs 75 can have a height similar to the ribs 74.

Figure 4:
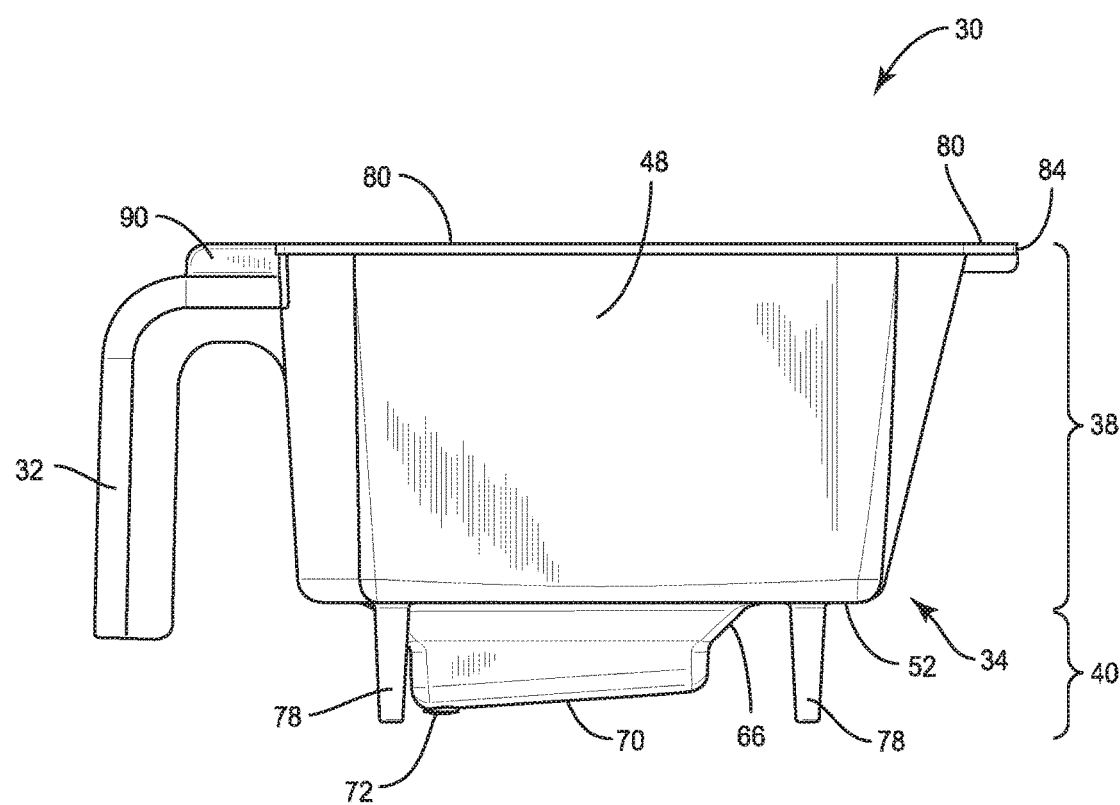
FIG. 4 is a side view of the brew basket of FIG. 2.

As shown in FIG. 4, to prevent damage to the floor 70 or the discharge port 72, legs 78 can extend down from the exterior side of the bottom wall 52 of the upper chamber 38. The legs 78 are designed to be of sufficient length such that the legs can support the brew basket 30 on a support surface without any portion of the lower chamber 40 coming into contact with the support surface.

The brew basket 30 can be formed of any material such as plastics, for example, polyetherimide or polypropylene, stainless steel, metals, or other suitable materials. The preferred material should be heat resistant and light-weight, and can be certified by the National Sanitation Foundation (NSF). In one embodiment, a translucent or material is selected to allow the user to determine, without removing the brew basket 30 from the brewer 10 (FIG. 1), whether the brew process has commenced.

The brew basket 30 shown in FIGS. 2-6 has a lower chamber 40 specifically designed for allowing proper steeping of fresh brewed teas. Specifically, the overall dimensions, wall angles, raised ribs 74, studs 75 and discharge port 72 are designed to retain the water 71 for a time period that allows the tea to steep. While the illustrated brew basket 30 has a configuration that can be advantageous to steeping tea, it is contemplated that coffee could also be brewed with use of the illustrated brew basket.

As possibly best seen in FIG. 6, in order to support the brew basket 30 on the rails 18 (FIG. 1) of the brewer 10 (FIG. 1), the body 34 includes a rim 80 extending outwardly around at least a portion of the top opening 44 relative to a center C of the top opening. In the illustrated embodiment, the periphery of the rim 80 is primarily curved or rounded in shape. The rounded nature of much of the rim 80 allows the brew basket 30 to be capable of rotating when installed between the rails 18 of the brewer 10. This rotation can be described as rotation about a vertical axis passing through the center C of the top opening 44.

In several embodiments, including the embodiment of FIG. 6, the periphery of the rim 80 is not a true circle. Particularly, an area 82 of the rim 80 located opposite to the handle 32 can deviate from a true circle centered at the center C of the top opening 44. For example, as shown in FIG. 6, a radial distance D is measured from the center C to an edge 84 of the rim 80. In an embodiment, the radial distance D is not constant in each radial direction extending from the center C. In one embodiment, the radial distance D is greatest in a direction extending away from the handle 32. For clarity, an arrow H is shown in FIG. 6 bisecting the handle 32 and extending outward relative to the center C. The directional arrow H can define a handle direction. In the embodiment shown in FIG. 6, the radial distance D continuously increases from a direction substantially perpendicular to the handle direction H to the direction opposite the handle direction. The periphery of the rim 80 can be shaped like a cam, e.g. rotationally asymmetric with respect to the center C of the top opening 44.

As also seen in the top view of FIG. 6, the discharge port 72 is located at a position offset from the center C. As will be understood by one of ordinary skill in the art, with the discharge port 72 offset from the center C, rotation of the brew basket 30 substantially about the center C will result in the discharge port translating in position relative to the spray head 20 (FIG. 1) of the brewer 10 (FIG. 1), as discussed further below.

The brew basket 30 may have other features. For example, as seen in FIG. 2, the brew basket 30 may include a stop projection 90. In this illustrated embodiment, the stop projection 90 extends upward from the handle 32. In the illustrated embodiment, the rim 80 includes a cut-out 92 in a region adjacent to the handle 32. The cut-out 92 can assist with manufacturing of the brew basket 30 when an injection molding process is used.

Placement and use of the brew basket 30 in conjunction with the brewer 10 may be best understood in view of FIG. 7, which shows a top view of the brew basket supported by the rails 18 below the hood 12 of the brewer 10. In phantom lines, the brew basket 30 is shown in a neutral position wherein the handle direction $H_N$ is generally parallel with the rails 18 and the handle 32 faces straight out from the brewer 10. In the neutral position, the brew basket 30 is inserted between the rails 18 until the rim 80 abuts the stop posts 22. In the neutral position, the discharge port is at $72_N$ and would be positioned between the two dispensers 16. The neural position would be useful if a single dispenser 16 was positioned directly below the hood 12.

Figure 7:
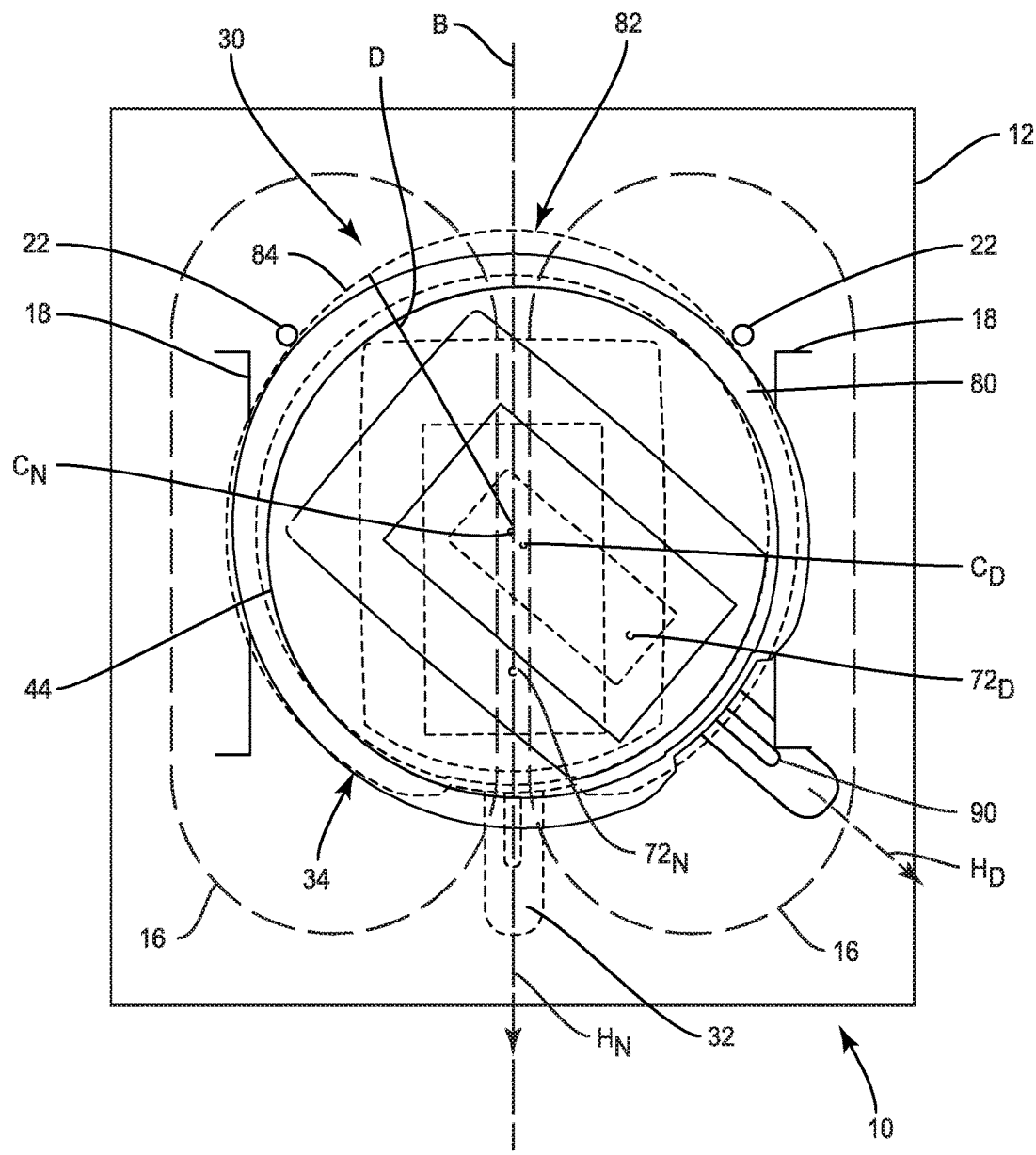
FIG. 7 shows a cut-away top view of the brew basket of FIG. 2 installed with the brewer.

In solid lines in FIG. 7, the brew basket 30 is shown in one of at least two dispensing positions. As used herein, a dispensing position is a position of the brew basket 30 relative to the hood 12 of the brewer 10 that positions the discharge port at $72_D$ off to a side of a front-to-back bisector B of the hood 12. In a dispensing position, the beverage extract leaving the discharge port 72 enters a dispenser 16 positioned to one side of the bisector B.

Continuing to reference FIG. 7, to shift the brew basket 30 from the neutral position to a dispensing position, the user can turn the handle 32 to rotate the body 34 substantially about a vertical axis passing through the center C of the top opening 44. The magnitude of rotation of the handle 32 can be limited by the stop projection 90 contacting an abutment surface. In the illustrated example, the abutment surface is a front of a respective rail 18.

As seen in FIG. 7, due to the cam shape of the rim 80, particularly in the area 82 opposite the handle 32, attempting to rotate the body 34 around the center at $C_N$ can cause the edge 84 of the rim 80 to remain in contact with at least one of the stop posts 22 of the hood 12. The increased distance D in the area 82 of the rim 80, that contacts the stop posts 22 in the dispensing position, can shift the center of the brew basket 10 to position $C_D$, a position shifted off of the bisector B relative to position $C_N$. The position $C_D$ is also shifted toward a front of the hood 12 relative to position $C_N$. The shape of the rim 80 and its interaction with at least one of the stop posts 22 positions the discharge port at $72_D$ along the bisector B forward toward a front of the brewer 10, and outward away from the bisector B, more than if the edge 84 of the rim 80 were a true circle centered at $C_N$. This adjustment in the position of the discharge port 72 relative to the bisector B also adjusts the position of the discharge port relative to the spray head 20 (FIG. 1) and the dispensers 16. The adjusted position of the illustrated embodiment provides that the discharge port 72 is positioned closer to the center of the dispenser 16 in the discharge position than if the rim 80 were truly round. Such positioning toward the center of the dispenser 16 and away from the edge of the dispenser reduces the potential for hot stream from the brewed beverage to cascade outside the dispenser 16.

The dispensing position provided by the brew basket 30 according to the present disclosure, and shown in FIG. 7, is compared to a neutral position. The dispensing position of the brew basket 30 with a rim 80 having a cam shape is compared to a brew basket with a true circular rim. One skilled in the art will appreciate that the dispensing position can be achieved without necessarily placing the brew basket 30 into the neutral position first. Instead, a user can also initially slide the brew basket 30 between the rails 18 with the handle 32 turned relative to the bisector B.

Figure 8:
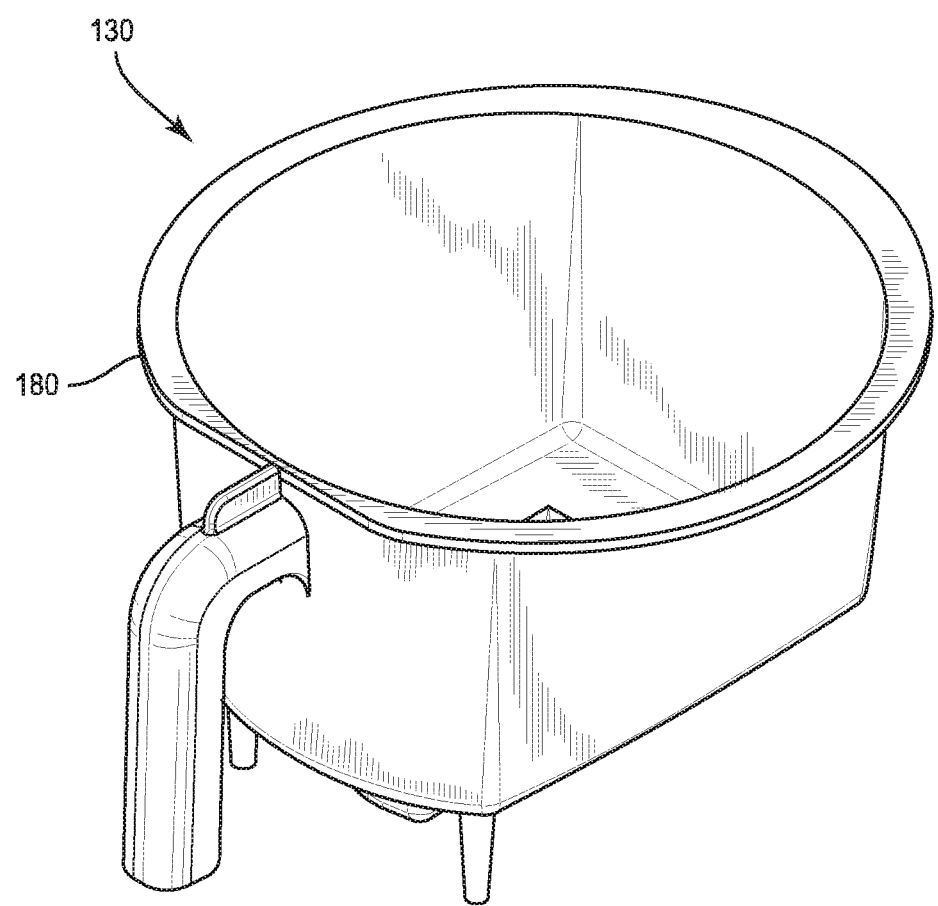
FIG. 8 is a perspective view of a brew basket according to a second embodiment of the present disclosure.
Figure 9:
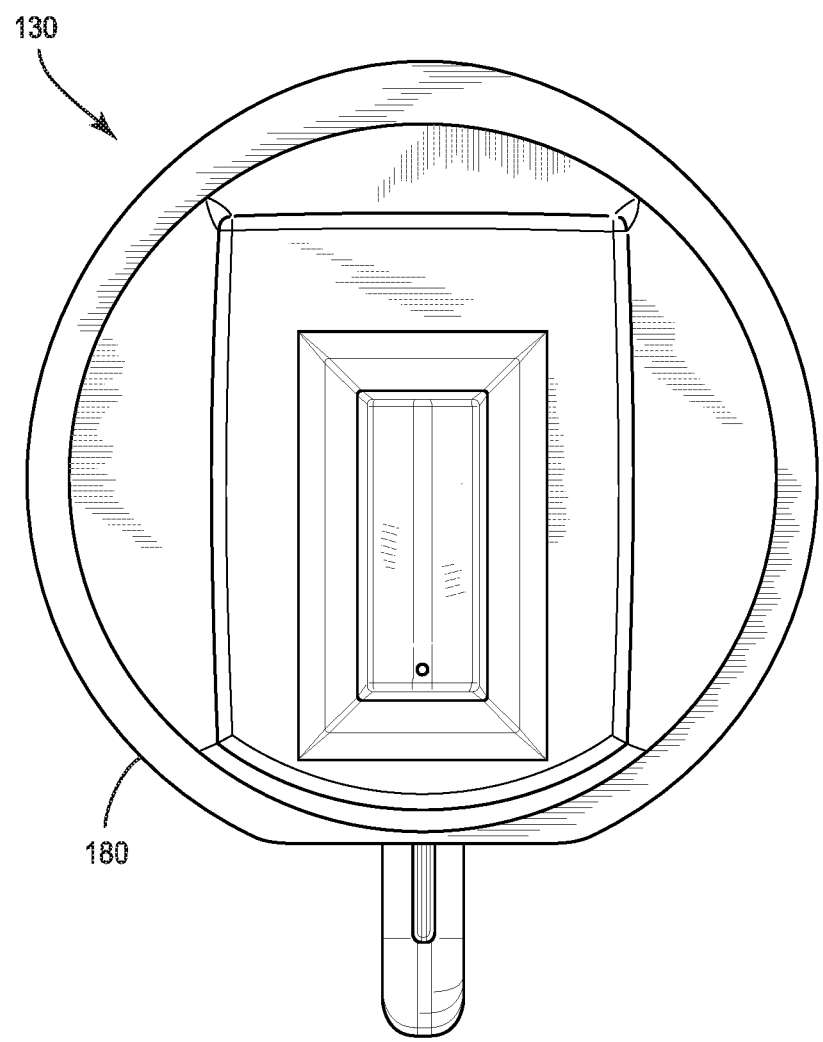
FIG. 9 is a top view of the brew basket of FIG. 8.

FIGS. 8 and 9, show a brew basket 130 according to an alternative embodiment. The brew basket 130 is substantially similar to the brew basket 30 shown in the first embodiment of FIGS. 1-7. The brew basket 130 has a rim 180 where the cut-out of the first embodiment is not present.

Figure 10:
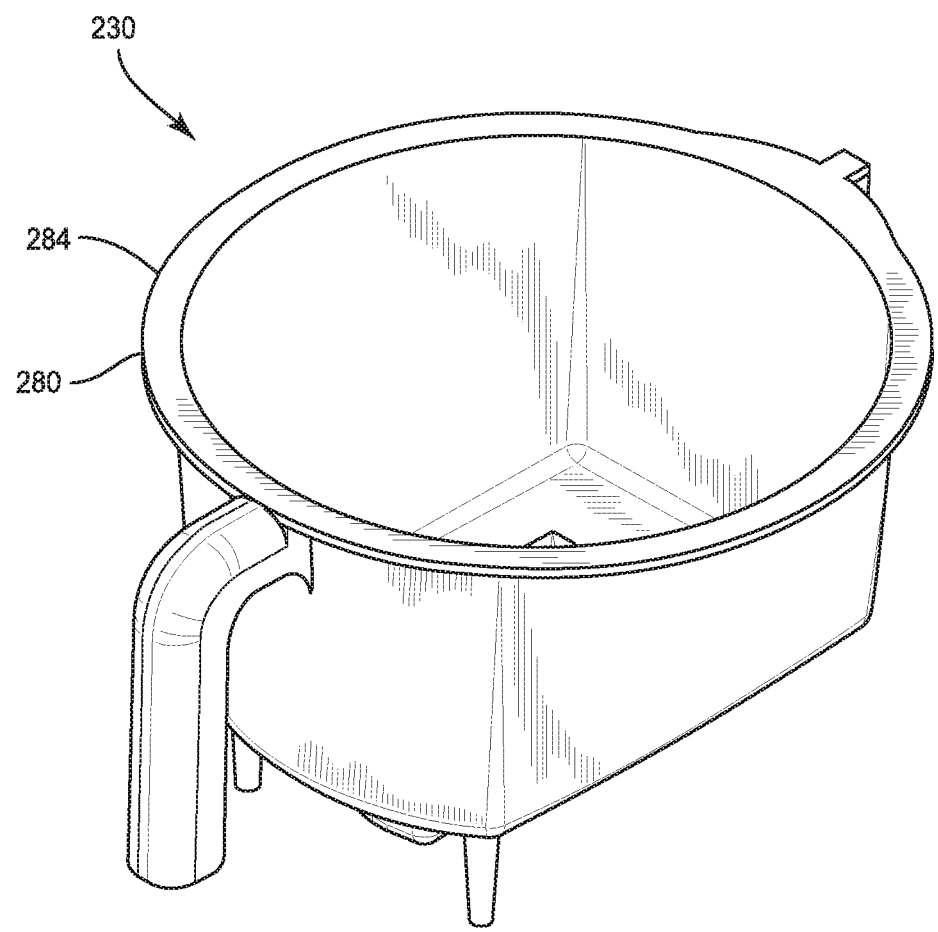
FIG. 10 is a perspective view of a brew basket according to a third embodiment of the present disclosure.
Figure 11:
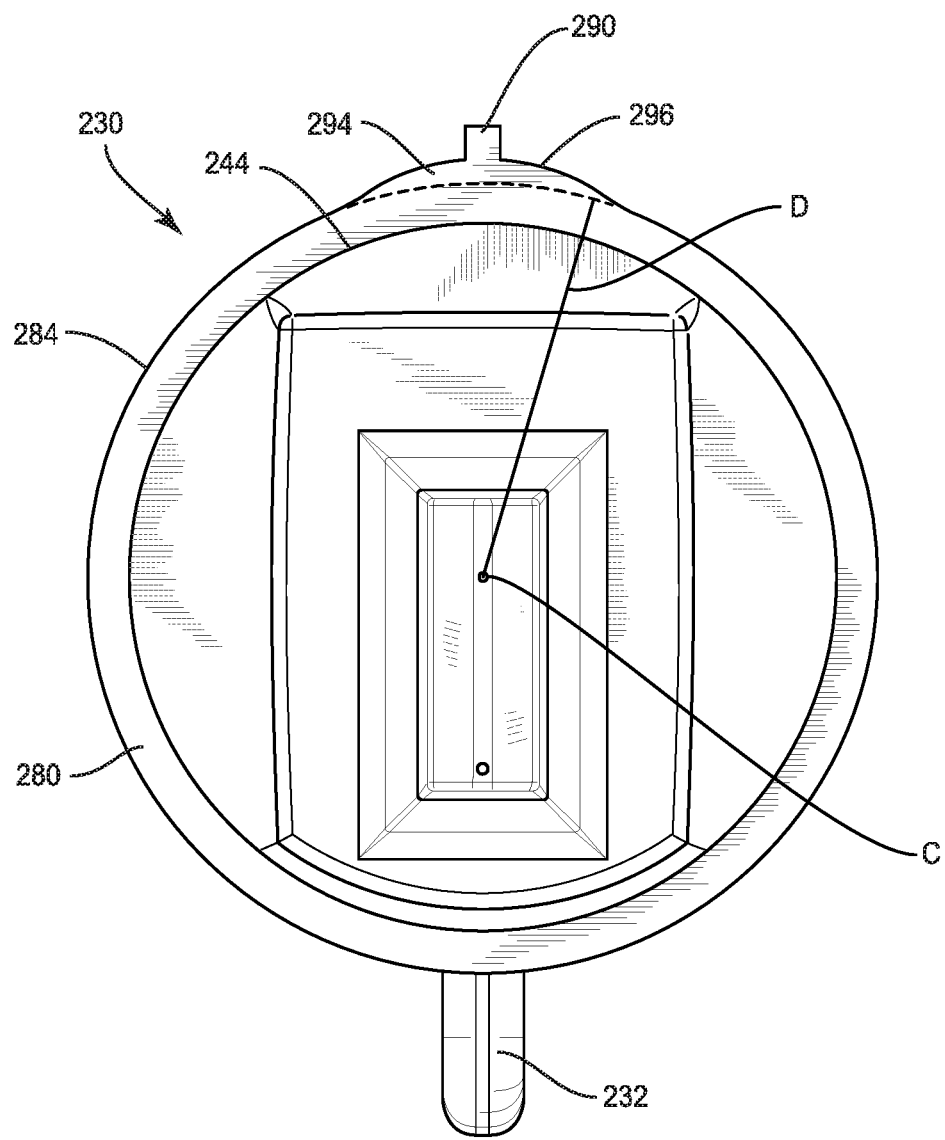
FIG. 11 is a top view of the brew basket of FIG. 10.

FIGS. 10 and 11 show a brew basket 230 according to another embodiment. In this embodiment, the radial distance D (FIG. 11) to the edge 284 of the rim 280 is substantially constant to form the periphery of the rim as a circle. In such an embodiment, an extension 294 can be formed integral with the rim 280 that extends in a direction away from the center C of the top opening 244. The extension 294 may be formed on the rim 280 at a position opposite from the handle 232. The extension 294 can have a curved edge 296 with a radius of curvature less than the radial distance D.

In addition, a stop projection 290 seen in FIG. 11 may be formed to project beyond the extension 294. When the brew basket 230 is in a dispensing position that is most displaced from the bisector B (FIG. 7), the stop projection 290 can be configured to come into contact with a respective one of the stop posts 22 of the brewer 10.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A brew basket, comprising:
a handle; and
a body attached to the handle, wherein the body provides an upper chamber and a lower chamber;
wherein a top opening to the upper chamber is substantially circular with a center,
wherein a floor of the upper chamber provides a shelf configured to initially support a beverage medium filter pack above the lower chamber,
wherein, when viewed from above, the shelf is substantially rectangular, and
wherein a discharge port is located at a bottom of the lower chamber and is offset from the center when viewed from above.

2. The brew basket of claim 1, wherein, when viewed from above, the lower chamber is substantially rectangular.

3. The brew basket of claim 1, wherein the brew basket is capable of being rotated when located between a pair of rails of a brewer.

4. The brew basket of claim 3, further comprising a stop projection configured to limit a magnitude of rotation of the brew basket relative to the brewer.

5. The brew basket of claim 4, wherein the stop projection is adjacent to the handle and is configured to abut one of the pair of rails to limit rotation.

6. The brew basket of claim 4, wherein the stop projection is located opposite the handle.

7. The brew basket of claim 1, wherein a rim extends from the top opening to support the brew basket between a pair of rails of a brewer,
wherein, a radial distance is measured from the center to an edge of the rim,
wherein, the radial distance is greatest in a direction extending opposite a handle direction,
wherein, when positioned between the pair of rails, the brew basket is rotatable between a neutral position and at least one dispensing position,
wherein, the handle direction is parallel with the pair of rails when the brew basket is in the neutral position, and the handle is rotated toward a respective one of the rails in the at least one dispensing position,
wherein the rim is configured to interact with a stop post of the brewer to translate the brew basket relative to the brewer while the handle is rotated from the neutral position to the at least one dispensing position.

8. The brew basket of claim 7, wherein the radial distance continuously increases from a direction substantially perpendicular to the handle direction to a direction opposite the handle direction.

9. The brew basket of claim 7, further comprising a stop projection extending from the rim along the direction opposite the handle direction.

10. A brewer, comprising:
a hood supporting a spray head and a pair of rails on opposite sides of the spray head;
a brew basket according to claim 1, rotatably supported between the pair of rails to receive water from the spray head; and
a pair of dispensers positioned below the hood,
wherein, rotating the brew basket relative to the pair of rails selectively positions the discharge port for dispensing beverage extract into a respective one of the pair of dispensers.

11. A brew basket, comprising:
a handle; and
a body attached to the handle, wherein a top opening to the body is substantially circular with a center, an imaginary arrow from the center bisecting the handle defines a handle direction; and
a stop projection,
wherein a discharge port of the body, when viewed from above, is offset from the center,
wherein a rim extends from the top opening to support the brew basket between a pair of rails of a brewer,
wherein, when positioned between the pair of rails, the brew basket is rotatable between a neutral position and a dispensing position around a vertical axis passing through the center,
wherein the handle direction is parallel with the pair of rails when the brew basket is in the neutral position, and the handle is rotated toward a respective one of the rails in the dispensing position,
wherein the rim is configured to interact with a stop post of the brewer to translate the brew basket relative to the brewer while the handle is rotated from the neutral position to the dispensing position, and
wherein the stop projection is configured to abut one of a pair of rails to limit rotation of the brew basket.

12. The brew basket of claim 11, wherein a radial distance is measured from the center to an edge of the rim, wherein the radial distance is greatest in a direction extending opposite the handle direction.

13. The brew basket of claim 12, wherein the radial distance continuously increases from a direction substantially perpendicular to the handle direction to the direction extending opposite the handle direction.

14. The brew basket of claim 11, further comprising a stop projection extending from the rim along a direction opposite the handle direction.

15. The brew basket of claim 11, comprising:
wherein the body provides an upper chamber and a lower chamber,
wherein a top opening to the upper chamber is substantially circular,
wherein a floor of the upper chamber provides a shelf for initially supporting a beverage medium filter pack above the lower chamber,
wherein when viewed from above, the shelf is substantially rectangular.

16. The brew basket of claim 15, wherein, when viewed from above, the lower chamber is substantially rectangular.

17. The brew basket of claim 11, wherein the stop projection is adjacent to the handle.

18. The brew basket of claim 11, wherein the stop projection is located opposite the handle.

19. A brewer, comprising:
a hood supporting a spray head and a pair of rails on opposite sides of the spray head;
a brew basket according to claim 11 rotatably supported between the pair of rails to receive water from the spray head; and
a pair of dispensers positioned below the hood,
wherein rotating the brew basket relative to the pair of rails selectively positions the discharge port for dispensing beverage extract into a respective one of the pair of dispensers.

* * * * *